United States Patent [19]
Yoshida et al.

[11] Patent Number: 5,231,966
[45] Date of Patent: Aug. 3, 1993

[54] FUEL INJECTION UNIT FOR ENGINE

[75] Inventors: Takeo Yoshida; Hidenori Suhara; Hidetoshi Ishigami, all of Iwata, Japan

[73] Assignee: Yamaha Hatsudoki Kabushiki Kaisha, Iwata, Japan

[21] Appl. No.: 805,311

[22] Filed: Dec. 10, 1991

[30] Foreign Application Priority Data

Dec. 10, 1990 [JP] Japan ............................ 2-401136

[51] Int. Cl.⁵ .............................................. F02M 7/00
[52] U.S. Cl. .................................................. 123/436
[58] Field of Search ............... 123/436, 419, 357, 359, 123/481

[56] References Cited

U.S. PATENT DOCUMENTS

| | | | |
|---|---|---|---|
| 4,104,990 | 8/1978 | Frobenius | 123/436 |
| 4,357,662 | 11/1982 | Schira et al. | 123/436 |
| 4,499,876 | 2/1985 | Yamamoto | 123/481 |
| 4,539,956 | 9/1985 | Hengel et al. | 123/357 |
| 4,590,907 | 5/1986 | Tsukamoto et al. | 123/357 |
| 4,616,617 | 10/1986 | Geiger et al. | 123/357 |
| 4,697,561 | 10/1987 | Citron | 123/436 |
| 4,705,000 | 11/1987 | Matsumura et al. | 123/357 |
| 4,766,863 | 8/1988 | Fujimori | 123/357 |
| 4,779,595 | 10/1988 | Fujimori | 123/357 |
| 4,883,038 | 11/1989 | Nakaniwa | 123/436 |
| 4,930,479 | 6/1990 | Osawa et al. | 123/436 |
| 5,000,151 | 3/1991 | Eisele et al. | 123/436 |
| 5,016,591 | 5/1991 | Nanyoshi et al. | 123/436 |
| 5,035,220 | 7/1991 | Uchinami et al. | 123/436 |
| 5,086,741 | 2/1992 | Nakamura et al. | 123/436 |
| 5,099,816 | 3/1992 | Ohga et al. | 123/481 |
| 5,105,788 | 4/1992 | Engel | 123/419 |
| 5,117,793 | 6/1992 | Taue et al. | 123/436 |
| 5,119,783 | 6/1992 | Komurasaki | 123/481 |

*Primary Examiner*—E. Rollins Cross
*Assistant Examiner*—Thomas N. Moulis
*Attorney, Agent, or Firm*—Ernest A. Beutler

[57] ABSTRACT

A four cylinder, two cycle crankcase compression, diesel fuel injected engine having an improved injection pump including an integral timer for timing the initiation and duration of fuel injection. A control system and method is disclosed for maintaining uniform running speed during all running conditions while reducing the amount of smoke produced by the engine. The speed uniformity is obtained by selecting a cylinder that deviates from the desired speed and adjusting the fuel injection of the cylinder firing preceding that cylinder on the next cycle. The engine also includes an improved arrangement for determining the timing of an event by measuring the incremental rotational speed of the engine immediately prior to the event to be timed.

68 Claims, 16 Drawing Sheets

FUEL INJECTION UNIT FOR ENGINE

BACKGROUND OF THE INVENTION

This invention relates to a fuel injection unit for an engine and method of operating such a fuel injection unit so as to reduce speed variations of the engine output shaft and a method of controlling the timing of an event in an internal combustion engine.

It is well known in multiple cylinder engines that different combustion characteristics from cylinder to cylinder can cause speed variations during the rotation of the output shaft angle as each cylinder fires. Noise, vibration and reduced output can result from such uneven speeds. Although it has been proposed to avoid cylinder to cylinder variation by mechanical adjustment, these mechanically adjusted devices are difficult to adjust and can not accommodate changes that may occur during the running of the engine. To avoid these problems, therefore, a system has been proposed wherein the speed increment added by each cylinder's firing is sensed and the amount of fuel supplied to each individual cylinder is varied so as to minimize variations in output shaft speed. Such a system is disclosed in the copending application entitled High Pressure Fuel Injection Unit, Ser. No. 656,244, filed Feb. 15, 1991 in the names of Jun Taue and Hidenori Suhara, which application is assigned to the Assignee hereof.

Although the system described in the aforenoted co-pending application is extremely effective, it is quite complicated in that it is necessary to measure the speed contributed by each cylinder and control each cylinder individually.

It is, therefore, a principal object of this invention to provide an improved fuel injection unit for an engine and method of operating it in which speed variations are substantially reduced or eliminated.

It is a further object of this invention to provide an improved and simplified arrangement for controlling uneven firing impulses generated by individual cylinders of a multiple cylinder fuel injected engine.

In connection with controlling the timing of the fuel injection of an engine or, for that matter, other events occuring in the engine such as the firing of a spark plug, it is a normal practice to employ a toothed wheel that rotates in unison with the engine output shaft and which has a plurality of teeth for providing individual pulses that indicate the angular position of the engine output shaft. However, it is not practical to employ a number of teeth equal to each degree or fractional degree of rotation of the crankshaft. Therefore, the timing of the events of the engine may not necessarily coincide with the individual pulses of the toothed timing wheel. Therefore, it is necessary to make some computation of the time it takes for the engine output shaft to rotate from one tooth until the occurrence of the event which is to be timed.

In order to calculate the time period between the toothed wheel pulse and the time which the event is to occur, it is necessary to measure the speed of rotation of the output shaft. This is normally done by selecting the time it takes the output shaft to rotate through a given angle and this is done by measuring the time at takes for a number of teeth on the toothed wheel to pass a sensor.

As has been noted, however, the speed of the output shaft varies during a single rotation and hence it is important to insure that the calculated speed is close to the speed which actually exists at the time the event is to occur. However, if a fixed number of teeth on the wheel at a fixed location are chosen, this may not coincide with the speed of rotation at the time immediately preceding the event to be timed.

It is, therefore, a further object of this invention to provide an improved method for measuring the speed of an output shaft at a time as close as possible to the occurrence of the event to be timed.

It is a further object of this invention to provide an improved method for measuring the speed of the output shaft of an engine to time an event.

In conjunction with the control of the initiation and duration of fuel injection by individual fuel injectors, it has been the practice to provide a sensing mechanism that senses the output shaft angle of the engine and also the rotational speed of the engine. Of course, this means that the fuel injection system must cooperate with sensors that are mounted on the engine independently of the fuel injector. This can give rise to some difference in the phase angle between the output shaft of the engine and the shaft of the fuel injection pump. Although it has been proposed to incorporate an internal timer in the fuel injection pump, the internal timers previously proposed only measure the angular rotation of the pump shaft and do not sense the initiation or reference signal of the engine output shaft from which to base the timing calculations.

It is, therefore, a further object of this invention to provide a fuel injection pump for an engine wherein the timer for the operating sequence and duration thereof is self contained within the fuel injection pump.

SUMMARY OF THE INVENTION

A first feature of this invention is adapted to be embodied in a method of minimizing variations in the speed of an output shaft of a fuel injected, multiple cylinder, internal combustion engine with the cylinders firing in a sequence. The method comprises the steps of selecting a cylinder that fires when the speed of the output shaft varies from the desired speed and adjusting the fuel injected to the cylinder firing adjacent the selected cylinder in a direction to bring the speed closer to the desired speed.

Another feature of the invention is adapted to be embodied in a multiple cylinder internal combustion engine having a plurality of cylinders each served by a respective fuel injector and incorporating an injection control system. The speed of the rotation of the output shaft of the engine is measured during the time each cylinder fires and the control means adjusts the speed of a cylinder firing adjacent a selected cylinder which selected cylinder contributes a speed which varies from the desired output shaft speed.

A further feature of the invention is adapted to be embodied in a method for controlling the timing of an event in an internal combustion engine having a shaft rotatable about an axis and means for generating a reference signal indicitive of a reference shaft angle position and for generating signals indicitive of incremental shaft angular positions. The method comprises the steps of selecting a first angular shaft position in relation to the reference shaft angular position and a later second angular shaft position both before the timing of the event. A fixed amount of shaft angular rotation is then selected. The time the shaft requires to rotate through the selected fixed angular amount after the reference shaft position is measured to compute the average speed. The time required for the shaft to reach the event timing from the second angular position is then computed from the measured angular speed.

Another feature of the invention is adapted to be embodied in a fuel injection pump and timer for an internal combustion engine. The pump and timer comprises housing means in which a driveshaft is journaled for rotation and which is driven in timed sequence with an output shaft of the engine. A fuel pump is contained within the housing means and is driven by the driveshaft for delivering fuel under pressure to a fuel injector of the engine. Timer means is contained within the housing means and is driven with the driveshaft for providing output signals indicitive of an engine output shaft reference angle and of the degree of angular rotation of the engine output shaft.

DETAILED DESCRIPTION OF THE PREFERRED EMBODIMENTS OF THE INVENTION

Figure 1:
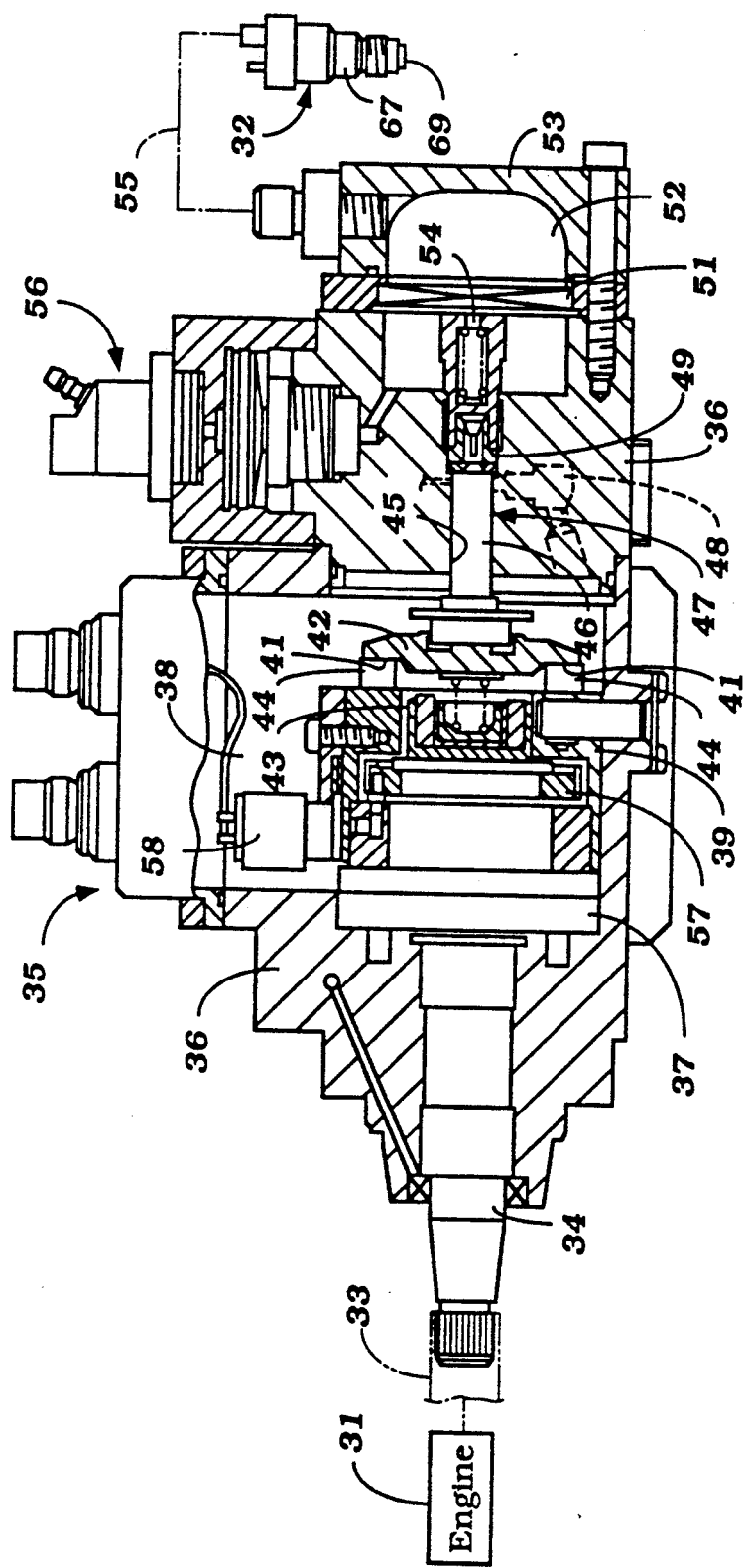
FIG. 1 is a partially schematic cross sectional view showing an engine having a fuel injection system constructed and operated in accordance with an embodiment of the invention.

Referring first in detail to the drawings and initially to FIG. 1, an internal combustion engine is shown schematically and identified generally by the reference numeral 31. In the illustrated embodiment, the engine 31 is a four cylinder, inline, two cycle, crankcase compression engine operating on a diesel cycle. Although the invention is described in conjunction with such an engine, it will be readily apparent to those skilled in the art that the invention can be employed with engines operating on other than the diesel and two stroke crankcase compression principals and also on engines other than reciprocating engines. Therefore, when the term "cylinder" is used in the specification and claims hereof it is intended to refer to a combustion chamber of the engine be it a reciprocating or a rotary type engine.

The engine is provided with individual fuel injectors 32, at least one for each cylinder which, in the illustrated embodiment, are accumulator type direct injection nozzles. The construction of the individual nozzles 32 will be described later by particular reference to FIG. 3. Again, although the invention is described in conjunction with such an accumulator type injection nozzle, it should be understood that facets of the invention can be employed with other types of charge formers and other types of fuel injectors.

The engine 31 drives a coupling 33 which is connected to a drive shaft 34 of a high pressure fuel injection pump and timer, indicated generally by the reference numeral 35. The fuel injection pump 35 preferably is of the type described in the copending application entitled "Fuel Injection Device For Engine", Ser. No. 753,708, filed Sep. 3, 1991 and assigned to the Assignee hereof. The disclosure of that application is incorporated herein by reference and, for that reason, the full details of the fuel injection pump 35 will not be repeated here. However, for orientation purposes certain components will be described as hereinafter and also it should be noted that there is an important modification to the fuel injection pump 35 from that shown in co-pending application Ser. No. 753,708 in that it also incorporates the timing mechanism for indicating both a reference output shaft position and the degree of angular rotation of the output shaft of the engine 31 for timing the injection of the individual cylinders thereof.

The injection pump 35 includes an outer housing assembly 36 in which the shaft 34 is rotatably journaled in a suitable manner. A gerotor type low pressure pump 37 is driven by the shaft 34 and draws fuel from a remotely positioned fuel tank (to be described) and delivers it to an internal chamber 38 of the housing assembly 36. A cam plate 39 is rotatably coupled to the shaft 34 and cooperates with camming surfaces 41 of a pump drive ring 42 which is also journaled within the housing 36 and which has a driving connection to the shaft 37 which causes the ring 42 to rotate with the shaft 37 but also which permits it to move axially relative thereto. This driving connection is indicated generally by the reference numeral 43 and reference may be had to the aforedescribed co-pending application for its further details. Roller followers 44 are interposed between the rings 39 and 41 for transmitting this motion.

The housing assembly 36 defines a bore 45 in which a pumping plunger 46 is received to provide a high pressure pump, indicated generally by the reference numeral 47. The high pressure pump 47 draws fluid from the chamber 38 through an inlet passageway 48 and then delivers it through a discharge valve 49 through a filter 51 to an accumulator chamber 52 formed by a closure 53 of the housing assembly 36. The delivery valve 49 has a discharge port 54 that communicates directly with the filter 51. A plurality of supply lines 55 each extend to the injectors 32 for supplying fuel under pressure thereto in timed sequence.

As thus far described, the injector pump 35 is identical to that disclosed in co-pending application Ser. No. 753,708 including the incorporation of a relief valve mechanism, indicated generally by the reference numeral 56 which is described in more detail in the co-pending application, for controlling the pressure of the fuel supplied to the injectors 32 to either maintain a desired supply of fuel or to vary the amount of fuel that is supplied by varying the pressure at which it is supplied.

Figure 2:
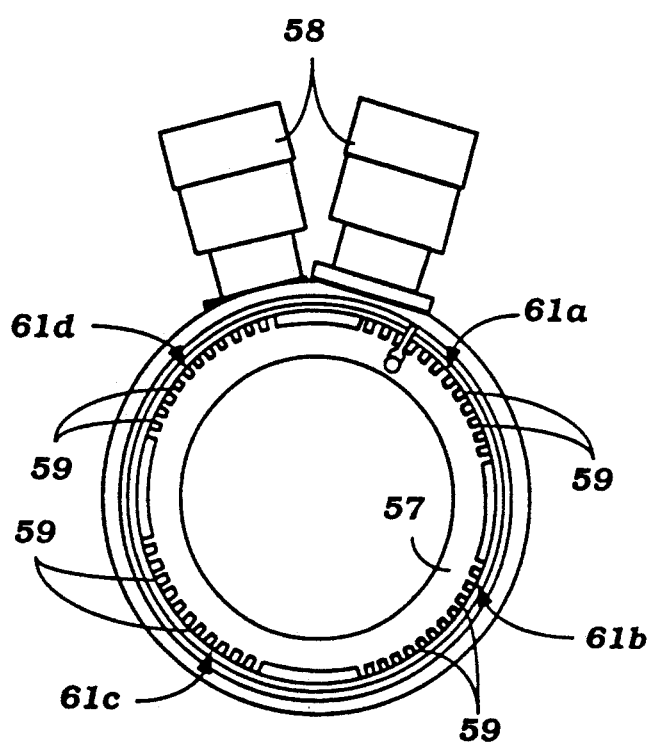
FIG. 2 is an enlarged view showing the portion of the fuel injection pump that contains the engine speed and cylinder sensing mechanism.
Figure 4:
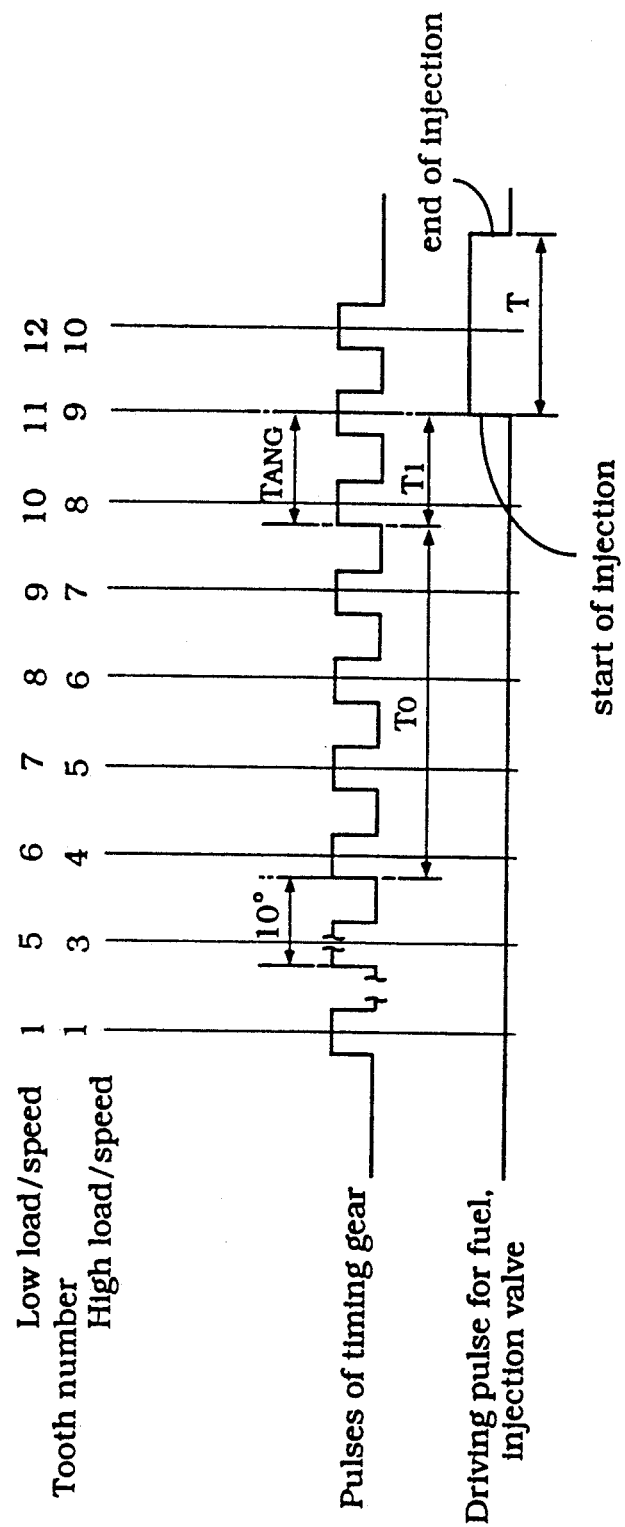
FIG. 4 is a graphical view showing how the timing of the start and end of injection is measured and calculated.
Figure 5:
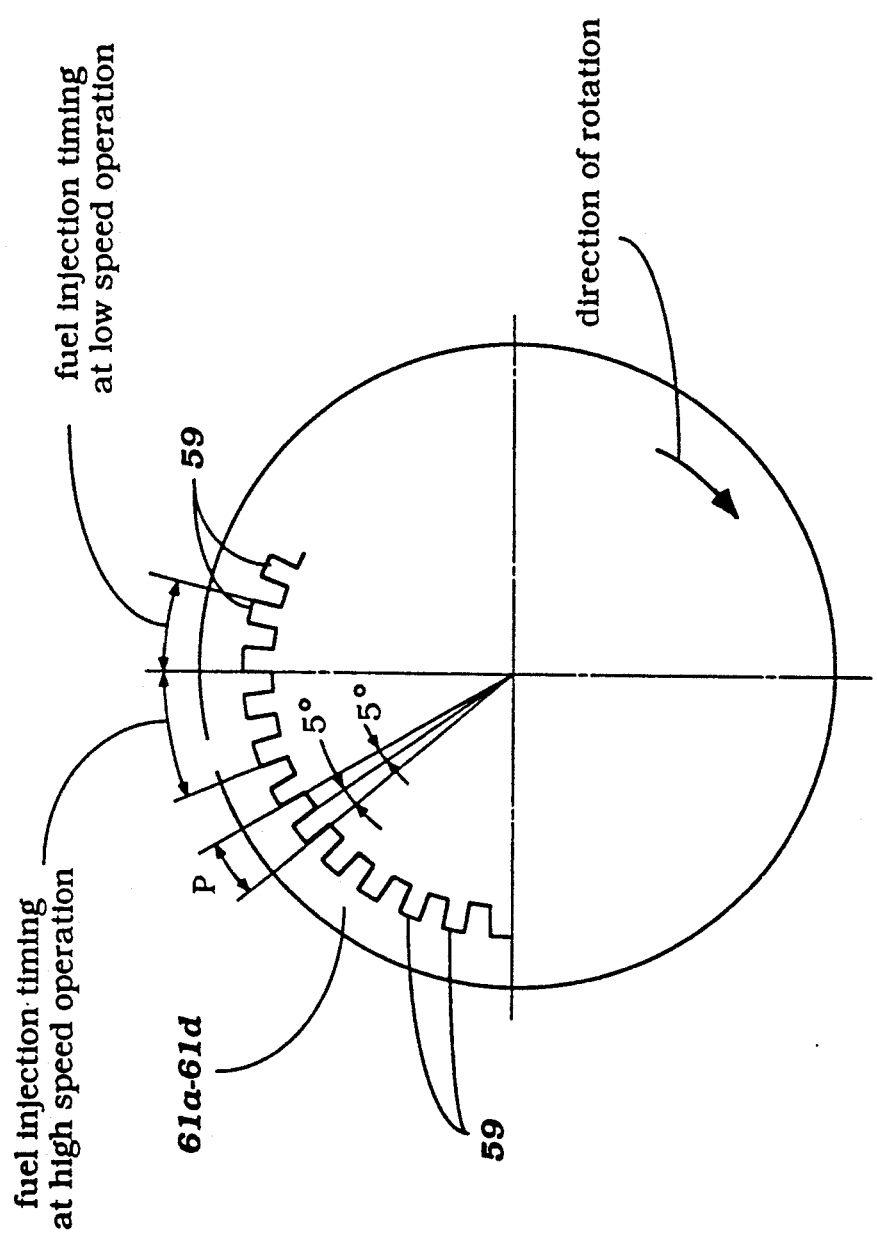
FIG. 5 is an enlarged cross sectional view showing how the crank angle is computed from the mechanism shown in FIG. 2.

In accordance with the instant construction, however, the fuel injection pump 35 also includes a timing sensing mechanism including a sensor ring 57 as best shown in FIGS. 2, 4 and 5 and sensors 58 which cooperate therewith in a manner now to be described by particular reference to those figures.

It has already been noted that the engine 32 is a four cylinder two stroke diesel engine and hence there are four firings which occur each rotation of the crankshaft of the engine. As a result of this arrangement, it is possible to use sensor ring 57 which rotates at one half crankshaft speed and which have sets of individual teeth 59 each of which causes a pulse to be generated by the sensors 58 when they pass by these sensors. The teeth 59 are arranged in groups 61a, 61b, 61c and 61d each of which corresponds to one of the cylinders of the engine and are schematically shown in FIG. 2. Preferably, the top dead center position of the individual cylinders is disposed somewhere between the ends of the tooth segment 61a, 61b, 61c and 61d, for a reason which will become apparent.

As may be seen in FIGS. 4 and 5, the individual teeth each generate respective pulses which are shown in a linear fashion in FIG. 4 and in a circular fashion in FIG. 5 which will indicate the actual angle of rotation of the crankshaft of the engine 31. In addition, the number of teeth 59 of one of the segments 61a, 61b, 61c and 61d is different from the others so as to provide an easy way in which the system can determine which cylinder is which. In the illustrated embodiment, the firing order is cylinders a, b, c and d in that order and these cylinders need not necessarily be aligned in that order from one end of the engine to the other. That is, the cylinders are numbered a, b, c and d in their firing order sequence rather than their sequence from one end of the engine to the other although, these two may be the same. One of the sensors 58 serves the purpose of determining the direction of rotation and the other is used for speed and timing measurement.

In the illustrated embodiment, each of the teeth 59 extends angularly through 2¼ degrees and the spacing between the beginning of one tooth and the beginning of the next adjacent tooth is 5 degrees. Since the sensor ring 57 rotates at ½ crankshaft speed, the 5 degree spacing between the teeth of the sensor ring 57 is equivalent to 10 degrees of spacing on the crankshaft rotation, as is shown in FIG. 5. If a greater degree of accuracy is required, a greater number of teeth with finer spacing can be employed.

FIG. 4 illustrates how the initiation of the start of injection is determined. The system is controlled by a CPU, shown in FIG. 3 and identified generally by the reference numeral 62 which is premapped with desired injection timing intervals for all measured characteristics including speed and load. This method will be described later.

Figure 3:
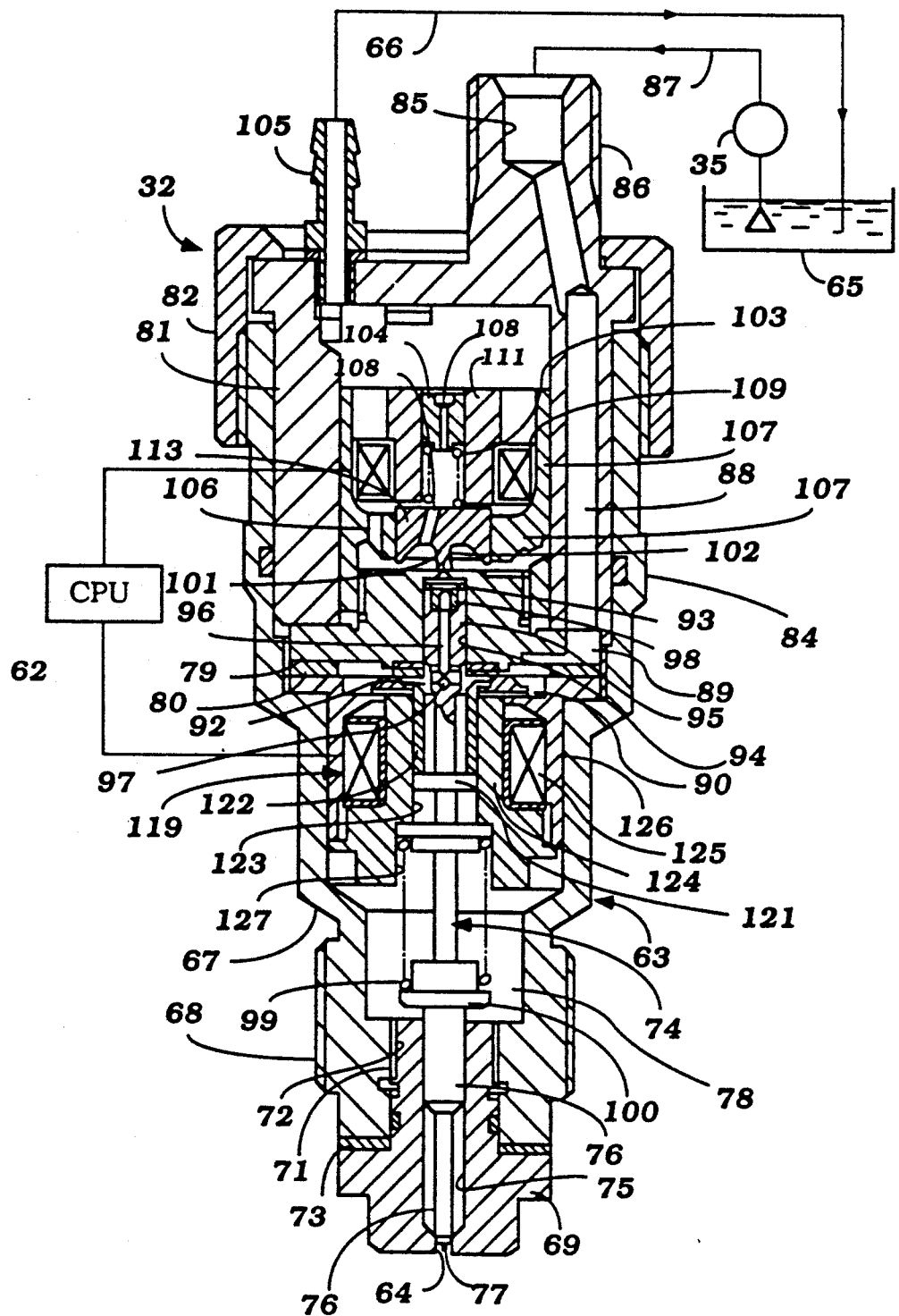
FIG. 3 is an enlarged cross sectional view taken through one of the fuel injectors of the engine and shows its relationship to the system in schematic fashion.

Referring now in detail to FIG. 3, each fuel injector 32 is of a type as is generally disclosed in U.S. Pat. No. 5,004,154, issued Apr. 2, 1991 in the names of Takeo Yoshida and Hajine Kishida and assigned to the Assignee hereof. The disclosure of that application is incorporated herein by reference but, as will become apparent, there are some significant modifications to the injector 32 from that shown in U.S. Pat. No. 5,004,154 to improve its performance. However, where any details of the injector 32 are not disclosed herein, reference may be had to U.S. Pat. No. 5,004,154 for the details of their construction and operation.

Referring now specifically to FIG. 3, each injector 32 is comprised of an outer housing assembly, indicated generally by the reference numeral 63 that is adapted to be mounted, in a manner to be described, in the cylinder head of the internal combustion engine 34 with a nozzle port 64 communicating with the combustion chamber for delivering fuel to it in a manner to be described. As has been noted, fuel is supplied to the injector 32 from a remotely positioned fuel tank 65 by means of the injector pump 35. Return fuel is returned back to the fuel tank 65 through a return line 66.

The outer housing 63 is comprised of a lower piece 65 that has a threaded lower end 68 that is adapted to be threaded into a suitable aperture in the cylinder head of the associated engine 31 in a known manner. The nozzle port 64 is defined by a tip 69 that has a threaded portion 71 that is received in a threaded bore 72 formed at the lower end of the housing piece 67. An adjusting shim 73 is interposed between the tip 69 and housing piece 67 for length adjustment. An injection valve 74 is slidably supported within a bore 75 of the tip 69 and has an enlarged portion 76 and a flow controlling tip 77 configured as will be described to provide flow control and which, in the closed position, closes the injection nozzle port 64. The valve portion 76 has interrupted enlargements for slidably supporting the injection valve 74 in the bore 75 in a known manner.

An accumulator chamber 78 is formed above the bore 75 by the housing piece 67. The accumulator chamber 78 is closed at its upper end by means of a closure plate 79 that is held against a spacer 80 received in a recess in the housing piece 67 by a second housing piece 81. The housing piece 81 is held to the piece 67 by a retainer ring 82 that is threaded onto the housing piece 67 so as to hold the closure plate 39 in position and maintain the chamber 78 in a sealed condition, except as is hereinafter noted. The housing piece 67 is formed with a hexagonal portion 84 so as to facilitate its insertion into the threaded bore of the cylinder head.

The housing piece 81 is formed with a inlet conduit 85 that has a threaded external portion 86 so as to receive a fitting for connecting a supply line 87 extending from the injector pump 35 to the inlet conduit 85.

The inlet conduit 85, which is generally a drilled opening, is intersected by a further drilled passageway 88 that extends axially along the housing piece 81 at one side thereof and which communicates at its lower end with a corresponding circumferential groove 89 formed in the upper surface of the closure plate 79. The groove 89 is intersected by a port 90. The port 90 delivers fuel under pressure to the accumulator chamber 78 through a port 91 formed in a control stop armature 92. The function of the control stop armature 92 will be described later.

A control chamber 93 is formed in the closure plate 79 by means of a bore 94 that opens through the lower end of the closure plate 79. The injection valve 74 has a generally cylindrical actuator portion 95 that is slidably supported within the bore 94 and which closes the lower end of the control chamber 93. A passageway 96 formed in the actuation portion 95 intersects a bore 97 formed therein which pressurizes the control chamber 93 through a metering jet 98 and normally urges the injection valve 74 toward its downward or closed position.

A coil compression spring 93 encircles the injection valve 74 and bears against the housing assembly 63 in a manner to be described. The lower end of the spring 99 engages a shoulder formed by an enlargement 100 on the injection valve 74 so as to further assist in maintaining the injection valve 74 in the closed position as shown in FIG. 3.

A relief valve 202 is supported within the housing assembly 63 above the upper end of the closure plate 79 and controls the opening of a relief passage 102 formed in the upper end of the closure plate 79. The relief valve 101 is normally biased to a closed position by means of a coil spring 103 the tension of which is adjusted by a screw 104.

The relief valve 101 when opened will permit the fuel in the control chamber 93 to return to the tank 65 through a return passage 104 of a fitting 105 that extends axially through the end of the housing piece 81 parallel to the inlet passageway 85. The return passageway 104 communicates with the conduit 66. Fuel can flow from the relief valve passageway 102 to the return passageway 104 through a port 106 formed in a yoke of an electromagnetic assembly, indicated generally by the reference numeral 107. This yoke of the electromagnetic assembly 107 has a threaded opening at its lower end which is received on a threaded portion of the closure plate 79 so as to secure the electromagnetic assembly 107 in position. In addition, return passages 108 are formed in both the relief valve 101, which also acts as an armature, as will become apparent, and the adjusting screw 104 so as to provide adequate flow path back to the return line 66 and insure rapid movement of the relief valve 101.

The electromagnetic assembly 107 is comprised of a solenoid coil or winding 109 that is disposed in the yoke and which encircles a core 111. The core 111 is formed with at bore that receives the spring 103 and screw 104. The core 111 coacts with an armature 113 formed integrally with the relief valve 101 for opening it when the winding 109 is energized. A suitable circuit controlled by the CPU 62 energizes the winding 109.

As should be readily apparent, energization of the solenoid winding 109 will attract the armature 113 and relief valve 101 so as to open the relief valve port 102 and deplete the pressure in the control chamber 93. This depletion in pressure will cause the pressure acting on the injection valve 74 to urge the injection valve 74 upwardly toward an open position compressing the spring 99 and causing an amount of fuel to be delivered. The full opening position of the injection valve 74 is controlled by means of a control shim that is positioned in the control chamber 93 and which will be engaged by the actuating portion 95 so as to limit the degree of maximum opening.

A control stop mechanism, indicated generally by the reference numeral 119, is provided in the accumulator chamber 78 below the plate 79 and cooperates with a stop shoulder 121 on the injection valve 74 to control its degree of movement. This control stop mechanism 119 includes the armature 92 previously described and which has a cylindrical extension 122 that is received within a bore 123 of a core 124 of a solenoid. A solenoid winding 125 encircles the core 124 and is held in place by means of a yoke 126 that is received within the upper end of the accumulator chamber 78. The core 123 is provided with a counter bore 127 that receives the spring 99 as previously described.

When the winding 125 is not energized, the armature 92 and its extension 122 may move to the upper position as shown in FIG. 3 and energization of the solenoid winding 109 will cause full reciprocal movement of the injection valve 74. However, when the winding 125 is energized, the armature 92 and extension 122 will be drawn downwardly so as to engage the shoulder 121 on the injection valve 74 and limit its upward movement. This operation will be discussed further in conjunction with FIGS. 6 through 15.

The winding for the coil 125 is energized by the CPU 62 that provides the control strategy for actuating the winding 109 of the solenoid 107 that controls the relief valve 101 and the winding 125 of the stop mechanism 119.

Figure 6:
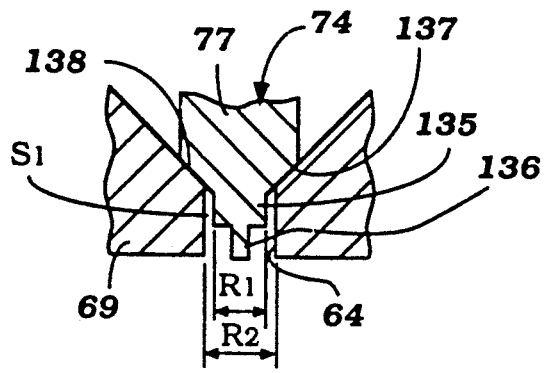
FIGS. 6, 7 and 8 are enlarged cross sectional views showing the relationship of the tip of the injector valve and the injector nozzle port in, respectively, the closed, low fuel and high fuel flow conditions.
Figure 7:
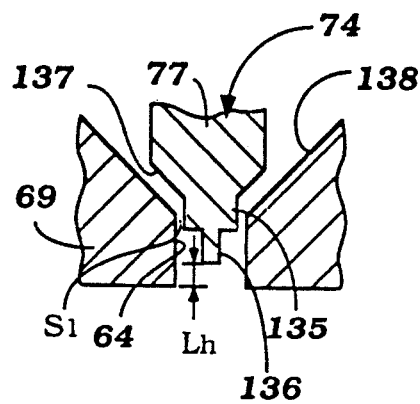
Figure 8:
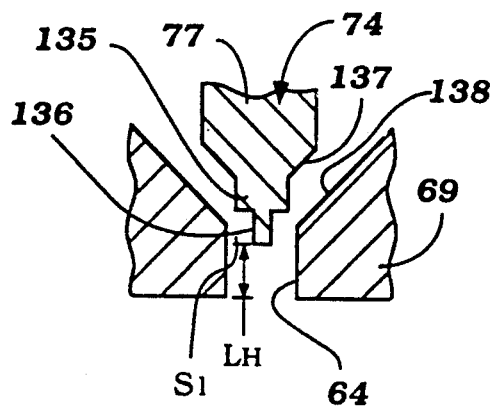
Figure 9:
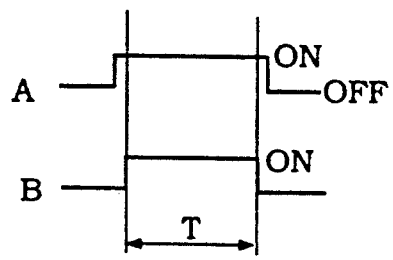
FIGS. 9, 10 and are graphical views showing the controlling pulses of the coils of the injector nozzle to provide low fuel flow, high fuel flow and mid range fuel flow, respectively.

Referring to FIGS. 6 through 8, as has been previously noted, the control tip portion 77 of the injection 74 is provided with a configured end so as to vary the amount of fuel supplied depending upon its position. For example, the portion 77 is provided with a first, larger diameter cylindrical portion 135 and a second smaller diameter portion 136 that corporate with the nozzle port 64 so as to control the flow through it. FIG. 6 shows the closed position while FIG. 7 shows the position for low fuel flow. In this latter position (FIG. 7) the solenoid winding 125 will be energized so as to limit the degree of opening of the injection valve 74 to the height Lh. In this position, the nozzle port 133 is open but the larger diameter portion 135 of the injection valve tip 77 will still be in position in the nozzle port 64 so as to restrict the fuel delivery.

On the other hand, when the winding 125 is not energized the injection valve 74 may move fully open to the position shown in FIG. 8 wherein the valve 74 moves through the distance LH. In this position, only the smaller diameter portion 136 will extend into the injection port 69 and substantially unrestricted fuel flow will be provided.

Above the larger diameter portion 135 the tip 77 of the valve 74 is provided with a tapered closure portion 137 that is adapted to engage a correspondingly tapered seat 138 formed at the upper end of the injection port 64. In the closed position (FIG. 6) these portions are in engagement and flow through the port 64 will be precluded.

Figure 10:
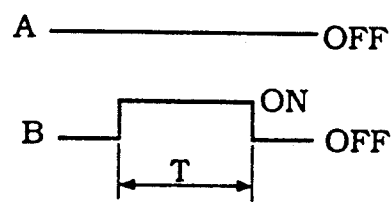
Figure 11:
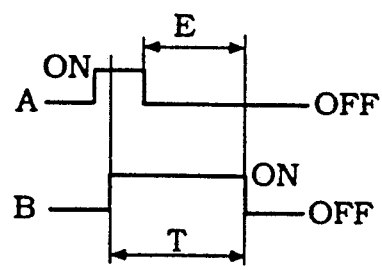
Figure 12:
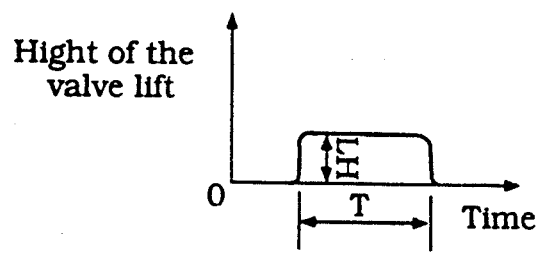
FIGS. 12, 13 and 14 are graphical views showing the relationship of the amount of injection valve opening under the conditions shown in FIGS. 9, 10 and 11, respectively.

Referring now to FIG. 9 through 14, one form of control strategy is depicted. For low engine speeds and when low fuel discharge is required, both the solenoid winding 125 is energized (pulse A) and the solenoid winding 109 is energized (pulse B). The solenoid winding 125 is energized prior to energization of the solenoid winding 109 and de-energized slightly after the time when the winding 109 is de-energized. The energization of the winding 109 is for the time T which is the total time of fuel injection. The reason the winding 125 is energized for a slightly longer time period is to insure that the stop member will be in position at the time when the solenoid winding 109 is energized. In this condition, the injection 24 will move to the position shown in FIG. 7 and a low fuel discharge and valve lift as shown in FIG. 12 will be accomplished.

Figure 13:
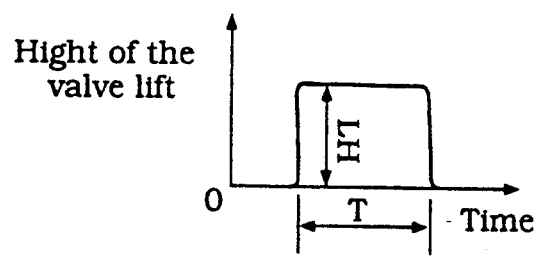

On the other hand, at maximum engine speed, the winding 125 is not provided with an energizing pulse and only the winding 109 is provided with an energizing pulse (B) for the time period T. The injection valve 74 is then held in its fully open position LH for the time T so as to achieve maximum fuel discharge as shown in FIGS. 10 and 13.

Figure 14:
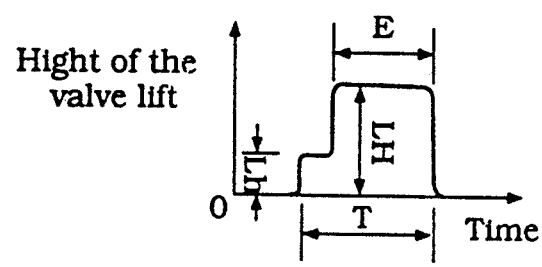

FIGS. 11 and 14 show how intermediate speed and load ranges can be accommodated by providing full energization of the winding 109 for the time T and varying the energization of the winding 125 for varying time periods so as to provide an initially low opening of the injection 74 Lh and then a full opening LH for a variable time period E. By varying the relative times, the amount of fuel delivered can be accurately controlled.

The aforedescribed control strategy for controlling the amount of fuel supplied to the engine 31 by the individual fuel injectors 32 applies during the various running conditions of the engine. However, in addition to the main fuel supply strategy already described, there is also provided a control strategy in the CPU 62 for minimizing speed variations caused by the individual firings of the individual cylinders of the engine.

However, rather than controlling each cylinder during each cycle so as to maintain uniform rotational speed of the engine output shaft, the system operates by selecting one cylinder, normally the one that deviates in speed the greatest from the average speed and adjusting the amount of fuel supplied to the adjacent firing cylinder, preferably the preceding cylinder, so as to alter the speed of the engine at the time the selected cylinder fires. This speed variation is accomplished by changing the amount of fuel injected. This change in the amount of fuel injection is achieved, in accordance with an embodiment of the invention, by changing the duration of fuel injection. This is done by shortening the duty cycle of the solenoid 109.

Figure 15:
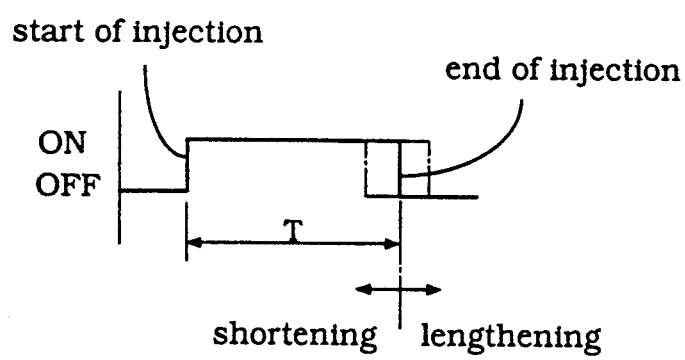
FIG. 15 is a graphical view showing the pulsing of the controlling solenoid of the fuel injector and shows one method in which the amount of fuel injected may be varied.
Figure 16:
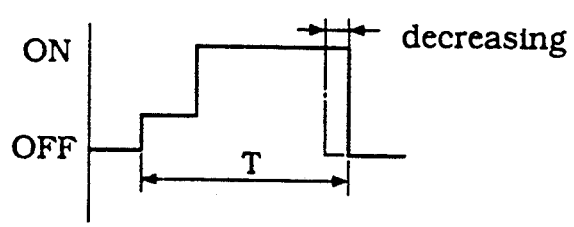
FIG. 16 is a graphical view in part similar to FIG. 15 showing one way in which the amount of fuel injected can be varied under medium load and speed conditions.
Figure 17:
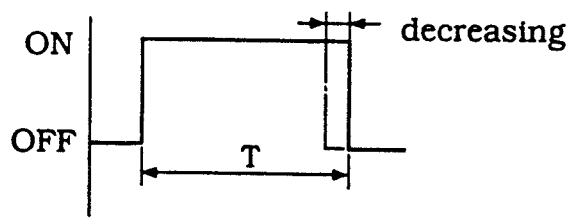
FIG. 17 is a graphical view, in part similar to FIGS. 15 and 16, showing how the fuel injection amount can be adjusted under the high speed, high low condition.

As may be seen in FIGS. 15, 16 and 17, this is accomplished under respectively the low mid range and high speed, high load conditions by changing the end of the time of injection while maintaining the start of injection the same for the selected engine running condition. By shortening the end of the injection the amount of fuel supplied is decreased and the engine speed will be reduced. By lengthening the time of injection, more fuel will be supplied and the engine speed will be increased.

Figure 18:
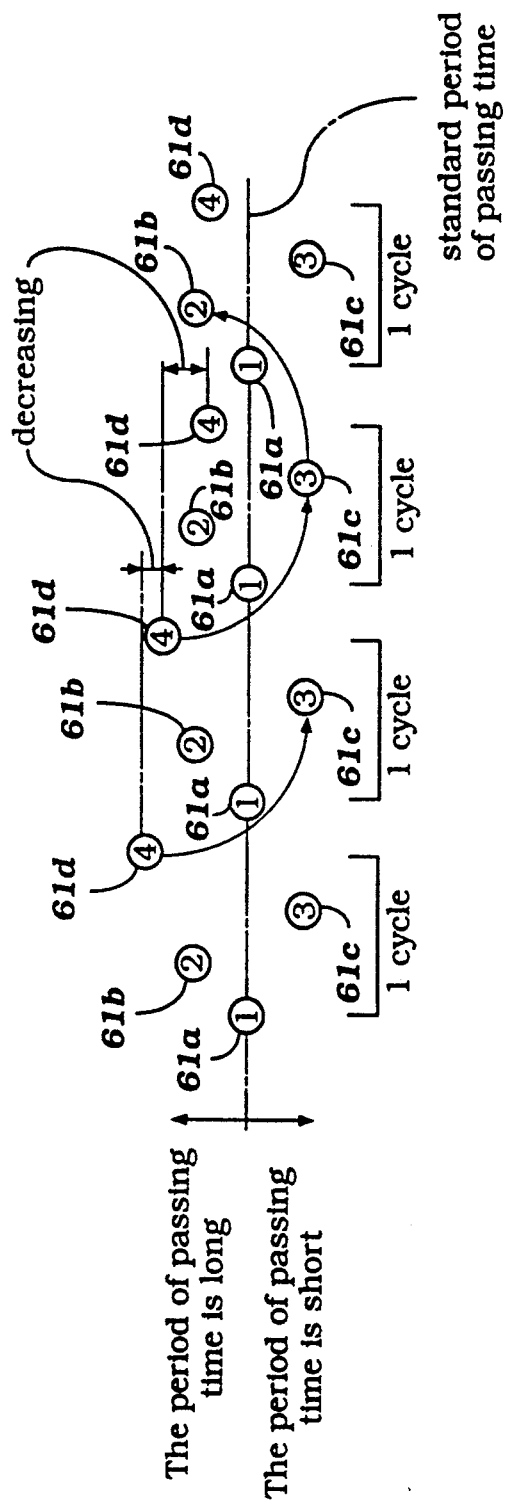
FIG. 18 is a timing diagram showing the firing of individual cylinders during successive cycles of rotation, the speed variation from the normal speed variation and the method by which speed variations are stabilized when operating in accordance with the idle control mode.

Referring now to FIG. 18, the strategy for achieving this result during idle operation is depicted schematically wherein the individual firings of the cylinders as sensed by the tooth portions 61a, 61b, 61c and 61d of the timer ring 57 are illustrated as are their deviations from the average rotational speed of the crankshaft as indicated by the dot/dash line identified "standard period of passing time". In the illustrated embodiment, cylinder number 1 (a) associated with the teeth 61a is depicted as presenting the average rotational speed during the crankshaft revolution although this need not be the case. In this case, it will be noted that in the first cycle the cylinder 4 (d) having the teeth 61d deviates the greatest from the average rotational speed. This deviation indicates a longer period of time and hence a slower rotational speed when cylinder number 4 (d) fires.

In order to compensate for this, the program moves to a strategy so that on the next cycle the preceding cylinder (cylinder number 3 (c)) is supplied with additional fuel so as to increase the speed of the engine when not only this cylinder fires but also when the succeeding cylinder, cylinder number 4 (d) fires. It may be seen then that when this occurs the deviation of the speed of cylinder number 4 (d) from the norm is reduced on this cycle. However, in the next succeeding cycle cylinder 4 (d) still has had the maximum deviation on the preceding cycle and the fuel injected to cylinder 3 (c) is again adjusted. This results in the third rotation of the crankshaft cylinder 4 (d) no longer has the greatest deviation from the normal speed but rather now cylinder 3 (c) has this deviation. Hence on the next, fourth rotation, of the crankshaft the cylinder preceding cylinder 3 (c), cylinder 2 (b), is adjusted. However, since cylinder 3 (c) is moving at too high a rotational speed since the passing time is short, then a slowing adjustment is made by reducing the amount of fuel supplied to cylinder 2 (b). This program then continues to repeat and, as should be readily apparent, provides less deviations in crankshaft speed as each cylinder of the engine fires.

Figure 19:
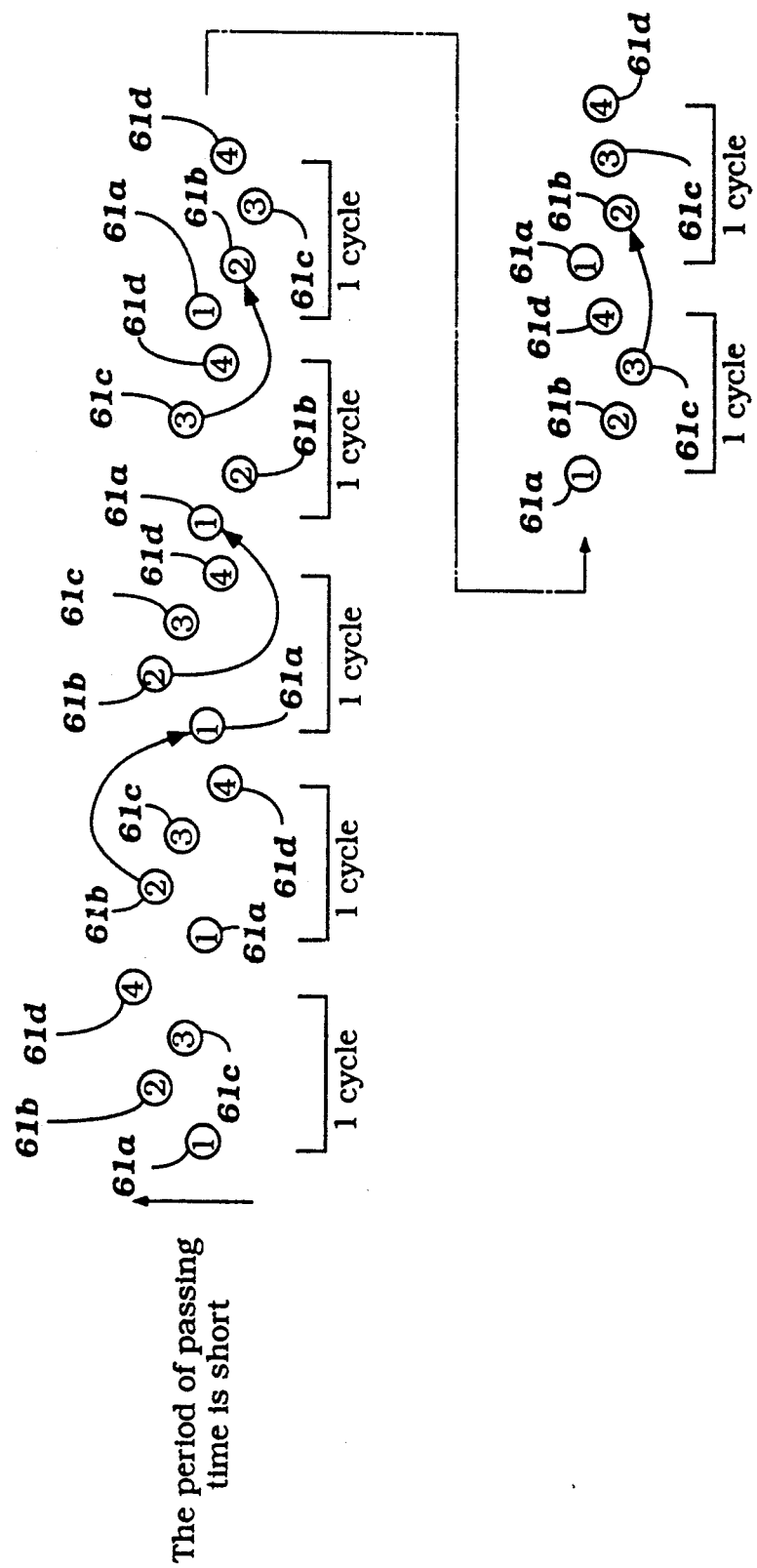
FIG. 19 is a graphical view, in part similar to FIG. 18, and shows the operation during all off idle conditions.

When operating at off idle condition, the same general philosophy for control is applied but the fuel control is varied in a slightly different manner. The reason for this is that smoke or soot is a problem with diesel engines and soot can result if too much fuel is injected. That is, if the engine is running over rich there will be a tendency for soot to form and hence this system operates so as to maintain engine speed uniformity during each rotation of the crankshaft while eliminating or reducing the likelihood of soot formation by avoiding, if possible, the supply of additional fuel. FIG. 19 shows a control arrangement for operating in off idle condition and in this figure it will be seen that in the first cycle cylinder number 4 (d) has the greatest deviation and hence on the next cycle cylinder 3 (c) is adjusted to reduce the speed. The program then moves on to change the amount of fuel injected by the preceding cylinder during successive steps to again stabilize the speed during crankshaft revolution.

Figure 20:
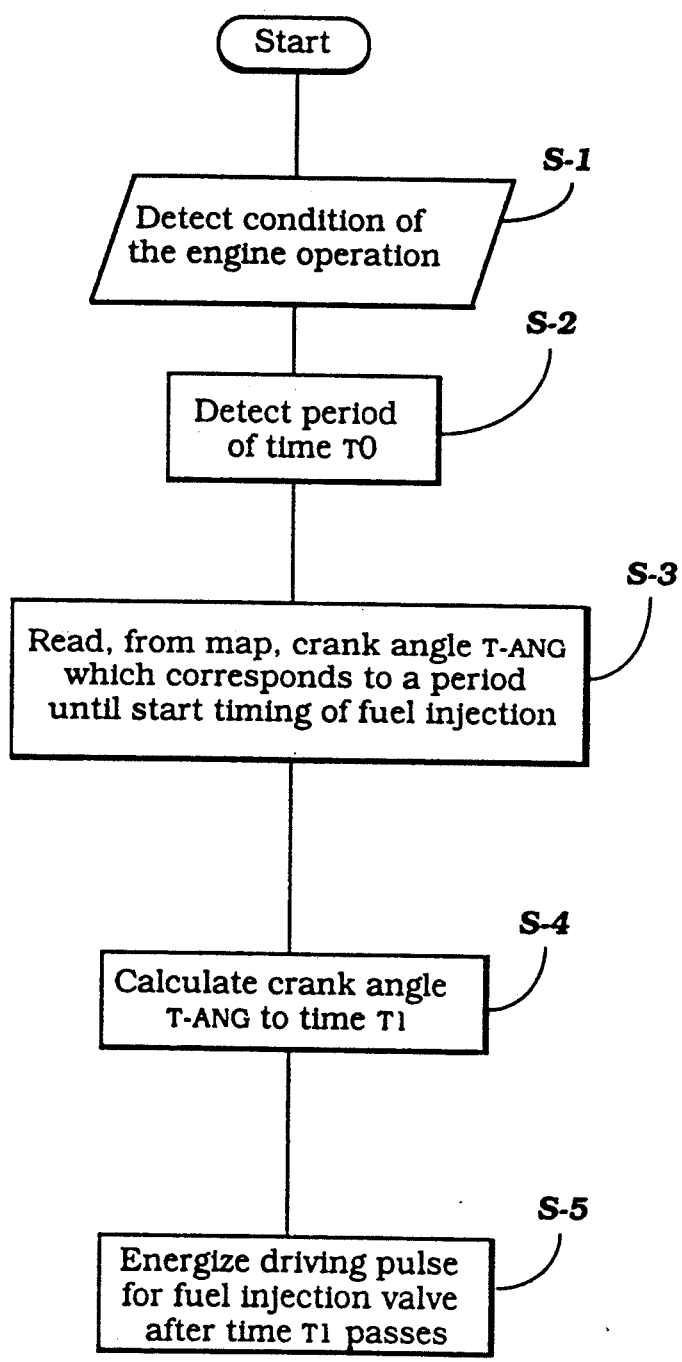
FIG. 20 is a graphical view showing the control routine for determining the start of timing of injection.

The control routine by which the CPU 62 operates will now be described by particular reference to FIGS. 20 through 22 which show a first control routine embodiment. Referring first to FIG. 20, this indicates the control routine for determining both the initiation of injection and the duration of injection considering a steady state running condition and not including the adjustment to maintain speed stability during a single crankshaft rotation.

In considering the program shown in FIG. 20 reference to FIGS. 4 and 5 will also be helpful inasmuch as these figures show the pulses of the timing gear with relation to the driving pulse for the fuel injector 32 and specifically the timing of energizing the winding 109 and de-energizing it. It should be understood also that similar calculations will be employed when the solenoid winding 125 is also energized or not energized during mid range performance.

After starting, the program moves to the step S1 so as to sense the engine operating condition. This may be done by sensing throttle position or other parameters indicating the engine load condition as well as other factors relating to ambient conditions so as to select the appropriate map for the fuel injection timing.

The program then moves to the step S2 to determine crankshaft speed over a time interval of a number of pulses by counting the time T0 for a given number of teeth, four in this embodiment, to pass the sensor 58. The four teeth associated with the segments 61a–61d used to measure the average rotational speed will be selected as teeth which precede slightly the tooth which will be adjacent the sensor 58 at the time when injection is begun. By picking a number of teeth slightly preceding the event to be timed, it is insured that the speed measurement will accurately reflect the speed of rotation of the engine crankshaft at the time the timed event occurs.

As may be seen in FIG. 1, at low speed the four chosen teeth will be the teeth 6 through 9 since injection timing is retarded at low speed. At high speed, the chosen teeth will be teeth 4 though 7 because injection timing is advanced when operating at the high speed condition. Measuring the rotational speed by counting four teeth associated with each cylinder then gives a basis to determine an average rotational speed of the engine on which to sense the deviations as will be later described.

The program then moves to the step S3 so as to read from the appropriate preprogrammed map to select a crank angle T-ANG which corresponds to the period of time until the start of fuel injection and also the time T for duration of fuel injection.

The program then moves to the step S4 so as to calculate the time T1 for the shaft to rotate through the angle T-ANG from the last tooth measured till the start of injection. The program then moves to the step S5 so as to energize the winding 109 at a time T1 that corresponds to the desired crank angle T-ANG as calculated from the average rotational speed of the crankshaft as previously measured by the time period T0.

Figure 21:
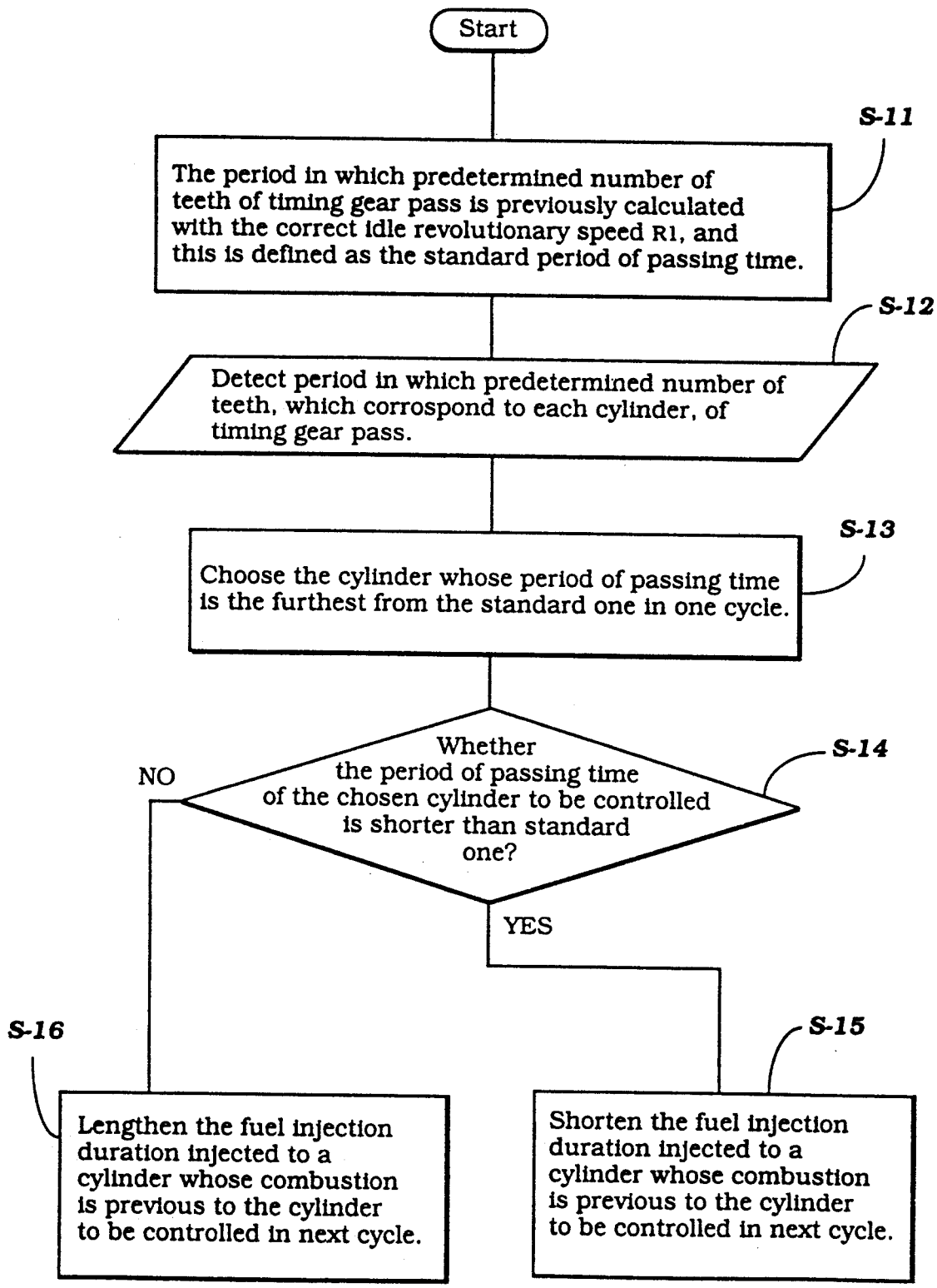
FIG. 21 is a graphical view showing the control routine for maintaining uniform engine speed during idle operation.

Referring now to FIG. 21, this shows the routine for maintaining uniformity in crankshaft speed during idle operation to follow the procedure previously referred to by reference to FIG. 18. In this program, the computer moves to the step S11 after start to enter the average rotational speed of the engine at idle R1, which is defined as the "standard period of passing time," computed as previously noted. The program then moves to the step S12 so as to detect the actual rotational speed associated with each cylinders firing by counting the time it takes for a set number of the teeth 61a, 61b, 61c and 61d (four, in the example given) to pass. The program then moves to the step S13 to determine which cylinder deviates the greatest from the standard period of passing time. It should be noted that this may be either a cylinder that is rotating faster or slower than the standard time period.

The program then moves to the step S14 to determine whether or not the period of time for the maximum deviation cylinder is shorter than the standard one. This is to determine whether the speed is greater or less than the standard speed.

If the speed is greater than the standard speed, then the program moves to the step S15 to shorten the duration of fuel injection of the preceding cylinder on the next cycle so as to reduce the amount of fuel supplied and accordingly the speed. If, on the other hand, at the step S14 it is determined that the deviation is on the slow side, then the program moves to a step S16 to increase the duration of fuel injection for the preceding cylinder so as to increase the speed. As has been noted by reference to FIG. 18, the continued repeat of this program will be effective to maintain uniformity in idle speed.

The off idle operational mode will now be described by reference to FIG. 22. As has been previously noted, with a diesel engine it is important to insure that excess fuel is not supplied to the cylinders so as to avoid smoke formation. This program operates to insure that end while, at the same time, maintaining speed stabilization. This is done by decreasing the amount of fuel supplied if at all possible.

Figure 22:
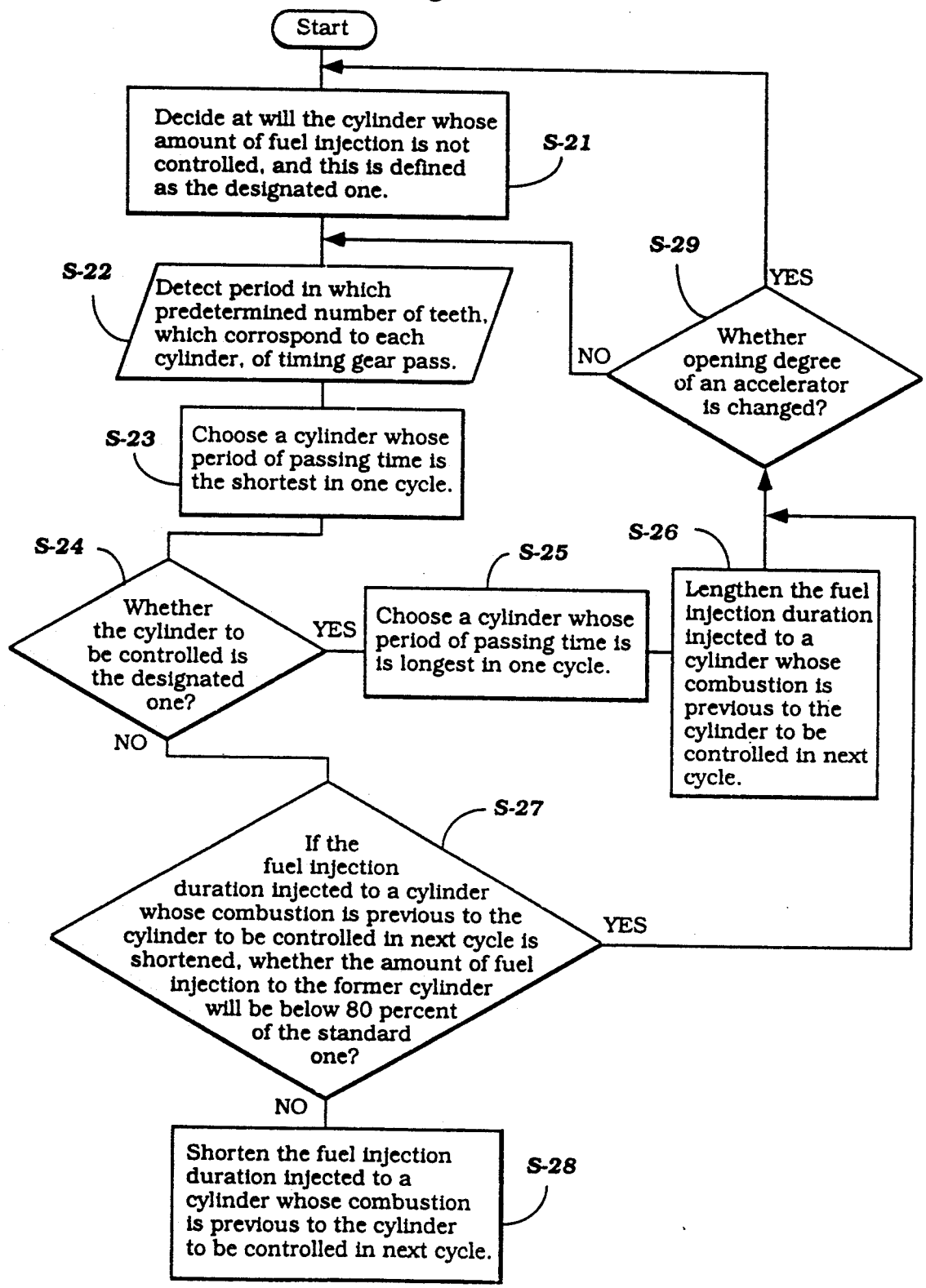
FIG. 22 is graphical view of a control routine for operating under off idle conditions to reduce speed variations.

Referring now to FIG. 22, when the program starts and assuming that this is the initial start of the program it moves to the step S21 to select a cylinder whose amount of fuel injection will not be controlled and this is defined as the "designated cylinder". The program then moves to the step S22 to measure the time of passing of the teeth 61a, 61b, 61c and 61d for each cylinder so as to measure their respective rotational speed increments during their firing cycle. The program then moves to the step S23 so select the fastest rotational speed associated with each cylinders firing. This is determined by selecting the shortest period of time for the respective number of teeth to pass. The program then moves to the step S24 to determine if the fastest cylinder is the designated cylinder If it is, then the program moves to the step S25 so as to select the cylinder traveling at the lowest speed that is the one having the longest time for its teeth to pass the sensor 59. The program then moves to the step S26 so as to increase the duration of fuel injection of the cylinder preceding the slowest one so as to increase the speed.

If, however, at the step S24 the fastest cylinder has been found not to be the designated cylinder, then the program moves to the step S27 so as to determine if the fuel injection duration of the preceding cylinder if reduced will be lower than a certain value which is less than 80% of a preselected standard value. If it is, the program then moves back to the step S26 so as to increase the duration of the fuel injection for the preceding cylinder rather than to reduce it. If, on the other hand, at the step S27 it is determined that the shortening of the duration of the fuel injection will not cause it to fall below 80% of the standard, the program moves to the step S28 so as to shorten the duration of the fuel injected to the preceding cylinder to slow the speed.

When the program completes the step 26, it repeats by going back to a step 29 to determine whether or not the degree of opening of the accelerator of the vehicle has been changed If it has not, the program repeats to begin over at the step 22 If, however, the accelerator position has been changed, then the program repeats back to the step 21 to again begin a complete new control routine In a similar manner, if the program at the step 27 indicates that the reduction of the fuel will take one cylinder below 80%, the program repeats back to the step 29 to again determine whether or not the accelerator position has been changed. If it has not, the program repeats beginning at the step 22 but if it has the program repeats by beginning at the step 21.

Figure 23:
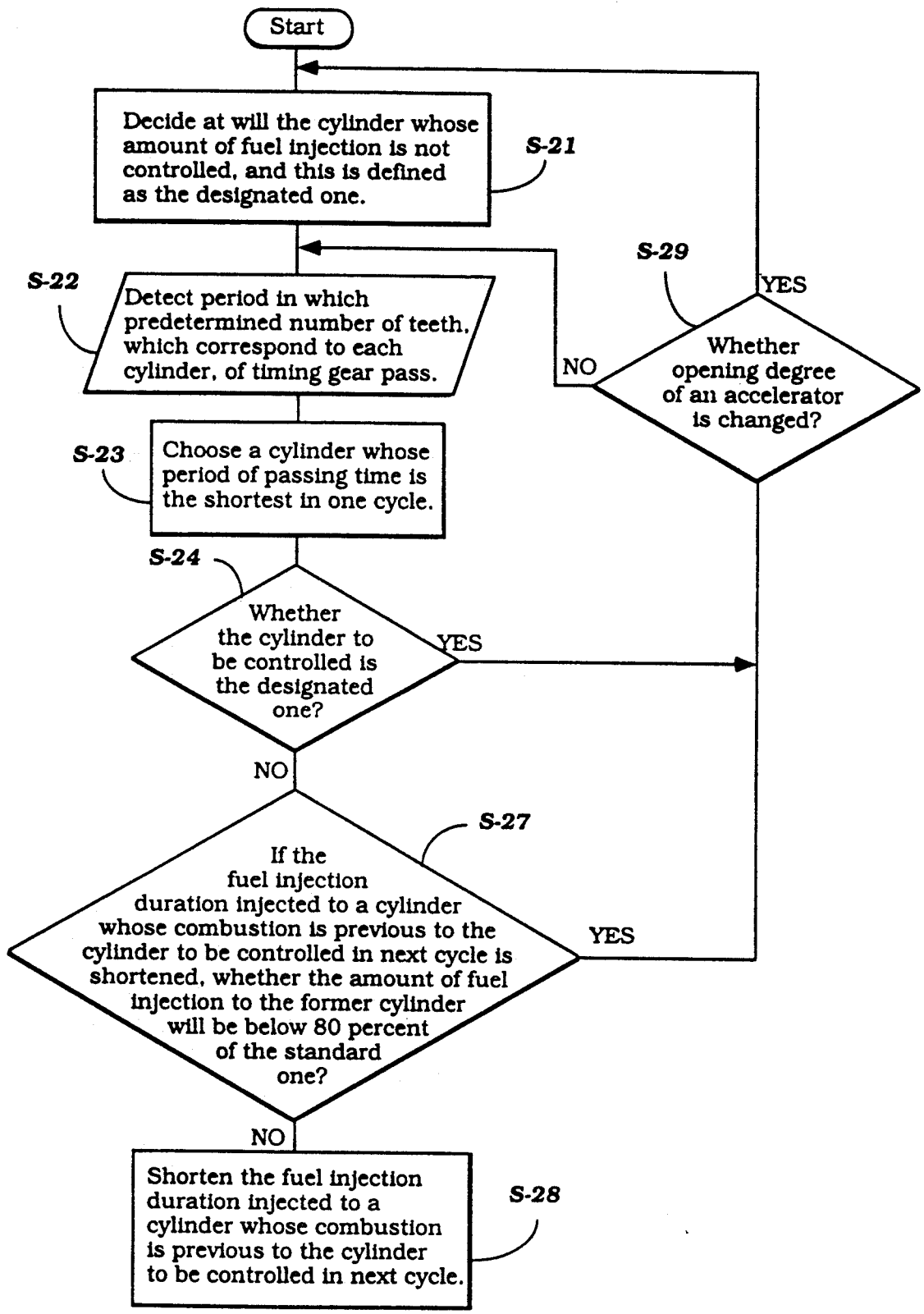
FIG. 23 is a diagram of the control of another control routine for maintaining uniform speed when operating in off idle conditions.

FIG. 23 shows another embodiment of the invention wherein the control strategy for the off idle condition is similar to the control strategy of FIG. 22, however, the steps 25 and 26 are eliminated so that there will be no increase in the duration of fuel injection. This will further assist in eliminating the soot or smoke problem and also will simplify the program. Because of the similarity of this program to that of FIG. 22, only the differences will be discussed and the total control routine will not be repeated.

If at the step S24 it is determined that the designated cylinder is the cylinder who is traveling at the highest rate of velocity or speed, then the program moves back to the step S29 rather than choosing the slowest cylinder as with the previously described embodiment. If at the step S29 it is determined that the accelerator condition has not changed, then the program repeats back to the step S22.

Also, if at the step S27 it is determined that a reduction in the fuel amount or time of fuel injection will bring the fuel injection below 80% of the standard, then the program does not lengthen the duration of fuel injection as previously but rather moves back to the step S29.

It should be readily apparent from the foregoing description that the described fuel injection system provides very good control of engine speed through a relatively simple arrangement which requires adjustments only of a single cylinder during succeeding operations rather than all cylinders under all operation. This simplification does not result in any significant deterioration in the ability of the system to maintain uniform rotational speed of the crankshaft Also, the system provides an arrangement for measuring rotational speed at a point immediately preceding the event to be timed so as to provide very accurate timing and employs a timer that is integrally formed within the fuel injection pump and hence does not rely upon external signals from sensors that are mounted on the engine independently of the fuel injection system for determining crankshaft angle and rotational speed.

It is also to be understood that the foregoing description is that of preferred embodiments of the invention and various changes and modifications may be made without departing from the spirit and scope of the invention, as defined by the appended claims.

We claim:

1. A method of minimizing variations in the speed of an output shaft of a fuel injected, multiple cylinder, internal combustion engine with the cylinders firing in a sequence, said method comprising steps of selecting a cylinder that fires when the speed of the output shaft varies from the desired speed and adjusting the fuel injected to only one cylinder during a single sequence of firing of all cylinders regardless of other variations in speed during the single sequence to bring the speed closer to the desired speed.

2. A method of minimizing variations in the speed as set forth in claim 1 wherein the fuel injected to the only one cylinder is adjusted by changing the amount of fuel injected.

3. A method of minimizing variations in the speed as set forth in claim 2 wherein the amount of fuel injected is adjusted by changing the duration of the injection.

4. A method of minimizing variations in the speed as set forth in claim 2 wherein the initiation of timing of fuel injection is not adjusted when the amount of fuel is adjusted.

5. A method of minimizing variations in the speed as set forth in claim 1 wherein the engine includes a shaft rotatable about an axis and having means for generating a reference signal indicative of a reference shaft angular position and for generating signals indicitive of incremental shaft angular positions, the speed of the output shaft being measured immediately prior to the beginning of fuel injection for each of the cylinders.

6. A method of minimizing variations in the speed as set forth in claim 5 wherein the speed is measured by selecting a fixed amount of shaft angular rotation immediately prior to the beginning of fuel injection for the respective cylinder and measuring the time the shaft requires to rotate through the selected fixed angular amount.

7. A method of minimizing variations in the speed as set forth in claim 6 further including controlling the time at which the fuel injection is initiated employing the measured average speed.

8. A method of minimizing variations in the speed as set forth in claim 7 wherein the time of fuel injection initiation is determined by selecting a first angular shaft position after the shaft reference angular position and a later second angular shaft position both before the timing of fuel injection and calculating the time required for the shaft to rotate through the increment necessary to initiate timing after the second angular shaft position by using the calculated speed.

9. A method of minimizing variations in the speed as set forth in claim 1 wherein the cylinder is selected by selecting the cylinder that deviates from the desired speed by the greatest amount.

10. A method of minimizing variations in the speed as set forth in claim 9 wherein the method is followed at a preselected running condition of the engine.

11. A method of minimizing variations in the speed as set forth in claim 10 wherein the preselected running condition is engine idle.

12. A method of minimizing variations in the speed as set forth in claim 9 wherein the fuel injected to the only one cylinder is adjusted by changing the amount of fuel injected.

13. A method of minimizing variations in the speed as set forth in claim 12 wherein the amount of fuel injected is adjusted by changing the duration of the injection.

14. A method of minimizing variations in the speed as set forth in claim 12 wherein the initiation of timing of fuel injection is not adjusted when the amount of fuel is adjusted.

15. A method of minimizing variations in the speed as set forth in claim 9 wherein the only one cylinder is a cylinder other than the selected cylinder.

16. A method of minimizing variations in the speed as set forth in claim 15 wherein the only one cylinder is a cylinder that fires adjacent the selected cylinder.

17. A method of minimizing variations in the speed as set forth in claim 16 wherein the adjacent cylinder is the cylinder which fires preceding the selected cylinder.

18. A method of minimizing variations in the speed as set forth in claim 12 wherein the amount of fuel injected by the preceding cylinder is changed on the next cycle of operation.

19. A method of minimizing variations in the speed as set forth in claim 13 wherein the steps are repeated in sequence to maintain the speed constant.

20. A method of minimizing variations in the speed of an output shaft of a fuel injected, multiple cylinder, internal combustion engine with the cylinders firing in a sequence, said method comprising steps of selecting a cylinder that fires when the speed of the output shaft varies from the desired speed and adjusting the fuel injected to the cylinder firing adjacent the selected cylinder in a direction to bring the speed closer to the desired speed, the cylinder selected being selected by picking a particular cylinder and selecting the cylinder that has the fastest angular velocity when it fires if that cylinder is other than the picked particular cylinder.

21. A method of minimizing variations in the speed as set forth in claim 20 wherein if the picked particular cylinder is the fastest cylinder then selecting the slowest cylinder and adjusting a cylinder adjacent that cylinder.

22. A method of minimizing variations in the speed as set forth in claim 21 wherein the fuel injected to the adjacent cylinder is adjusted by changing the amount of fuel injected.

23. A method of minimizing variations in the speed as set forth in claim 22 wherein the amount of fuel injected is adjusted by changing the duration of the injection.

24. A method of minimizing variations in the speed as set forth in claim 22 wherein the initiation of timing of fuel injection is not adjusted when the amount of fuel is adjusted.

25. A method of minimizing variations in the speed as set forth in claim 21 wherein the adjacent cylinder is the cylinder which fires preceding the selected cylinder.

26. A method of minimizing variations in the speed as set forth in claim 25 wherein the amount of fuel injected by the preceding cylinder is changed on the next cycle of operation.

27. A method of minimizing variations in the speed as set forth in claim 26 wherein the steps are repeated in sequence to maintain the speed constant.

28. A method of minimizing variations in the speed as set forth in claim 20 wherein the method is followed at a preselected running condition of the engine.

29. A method of minimizing variations in the speed as set forth in claim 28 wherein the one running condition is off idle condition.

30. A method of minimizing variations in the speed as set forth in claim 29 further including the step of minimizing variations in the speed of the output shaft at idle by selecting a cylinder that fires when the speed of the output shaft varies from the desired speed and adjusting the fuel injected to the cylinder firing adjacent the selected cylinder in a direction to bring the speed closer to the desired speed at idle speed.

31. An internal combustion engine having multiple cylinders and an output shaft driven by said cylinders, fuel injection means for injecting fuel into each of said cylinders, and control means for controlling the amount of fuel supplied by said fuel injectors, said control means including means for minimizing variations in the speed of the output shaft during a single revolution comprising means for selecting a cylinder that fires when the speed of the output shaft varies from the desired speed and adjusting the fuel injected to only one cylinder during a single sequence of firing of all cylinders regardless of other variations in speed during the single sequence to bring the speed closer to the desired speed.

32. An internal combustion engine as set forth in claim 31 wherein the initiation of timing of fuel injection is not adjusted when the amount of fuel is adjusted.

33. An internal combustion engine as set forth in claim 31 wherein the fuel injected to the only one cylinder is adjusted by changing the amount of fuel injected.

34. An internal combustion engine as set forth in claim 33 wherein the amount of fuel injected is adjusted by changing the duration of the injection.

35. An internal combustion engine as set forth in claim 31 wherein the cylinder is selected by selecting the cylinder that deviates from the desired speed by the greatest amount.

36. An internal combustion engine as set forth in claim 35 wherein the fuel injected to the only one cylinder is adjusted by changing the amount of fuel injected.

37. An internal combustion engine as set forth in claim 36 wherein the amount of fuel injected is adjusted by changing the duration of the injection.

38. An internal combustion engine as set forth in claim 36 wherein the initiation of timing of fuel injection is not adjusted when the amount of fuel is adjusted.

39. An internal combustion engine as set forth in claim 35 wherein the adjacent cylinder is the cylinder which fires preceding the selected cylinder.

40. An internal combustion engine set forth in claim 39 wherein the amount of fuel injected by the preceding cylinder is changed on the next cycle of operation.

41. An internal combustion engine as set forth in claim 40 wherein the control repeats the steps in sequence to maintain the speed constant.

42. An internal combustion engine as set forth in claim 35 wherein the control is followed at a preselected running condition of the engine.

43. An internal combustion engine as set forth in claim 42 wherein the preselected running condition is engine idle.

44. An internal combustion engine having multiple cylinders and an output shaft driven by said cylinders, fuel injection means for injecting fuel into each of said cylinders, and control means for controlling the amount of fuel supplied by said fuel injectors, said control means including means for minimizing variations in the speed of the output shaft during a single revolution comprising means for selecting a cylinder that fires when the speed of the output shaft varies from the desired speed and adjusting the fuel injected to the cylinder firing adjacent the selected cylinder in a direction to bring the speed closer to the desired speed, the cylinder selected being selected by picking a particular cylinder and selecting the cylinder that has the fastest angular velocity when it fires if that cylinder is other than the picked particular cylinder.

45. An internal combustion engine as set forth in claim 44 wherein if the picked particular cylinder is the fastest cylinder then selecting the slowest cylinder and adjusting the cylinder preceding that cylinder.

46. An internal combustion engine as set forth in claim 45 wherein the fuel injected to the adjacent cylinder is adjusted by changing the amount of fuel injected.

47. An internal combustion engine as set forth in claim 46 wherein the amount of fuel injected is adjusted by changing the duration of the injection.

48. An internal combustion engine as set forth in claim 46 wherein the initiation of timing of fuel injection is not adjusted when the amount of fuel is adjusted.

49. An internal combustion engine as set forth in claim 45 wherein the adjacent cylinder is the cylinder which fires preceding the selected cylinder.

50. An internal combustion engine as set forth in claim 49 wherein the amount of fuel injected by the preceding cylinder is changed on the next cycle of operation.

51. An internal combustion engine as set forth in claim 50 wherein the control repeats the steps in sequence to maintain the speed constant.

52. An internal combustion engine as set forth in claim 44 wherein the control is followed at a preselected running condition of the engine.

53. An internal combustion engine as set forth in claim 52 wherein the one running condition is off idle condition.

54. An internal combustion engine as set forth in claim 53 further including the control also minimizes variations in the speed of the output shaft at idle by selecting a cylinder that fires when the speed of the output shaft varies from the desired speed and adjusting the fuel injected to the cylinder firing adjacent the selected cylinder in a direction to bring the speed closer to the desired speed at idle speed.

55. An internal combustion engine having multiple cylinders and an output shaft driven by said cylinders, fuel injection means for injecting fuel into each of said cylinders, and control means for controlling the amount of fuel supplied by said fuel injectors, said control means including means for minimizing variations in the speed of the output shaft during a single revolution comprising means for selecting a cylinder that fires when the speed of the output shaft varies from the desired speed and adjusting the fuel injected to the cylinder firing adjacent the selected cylinder in a direction to bring the speed closer to the desired speed, fuel injection means including an injection pump having a drive shaft driven by the output shaft of said engine and timer means contained within said injection pump for providing a signal indicative of an engine output shaft reference angle and the degree of angular rotation of said engine output shaft.

56. An internal combustion engine as set forth in claim 55 wherein the fuel injection pump comprises a low pressure pump and a high pressure pump driven by the drive shaft.

57. An internal combustion engine as set forth in claim 56 wherein the high pressure pump is a piston pump.

58. An internal combustion engine as set forth in claim 57 wherein the piston pump has distributor means for distributing fuel from the piston pump to the individual fuel injectors of the engine.

59. A method of minimizing variations in the speed of an output shaft of a fuel injected, multiple cylinder, internal combustion engine with the cylinders firing in a sequence, said method comprising steps of selecting a cylinder that fires when the speed of the output shaft varies from the desired speed and adjusting the fuel injected to only one cylinder during a single sequence of firing of all cylinders to bring the speed closer to the desired speed, the only one cylinder being a cylinder other than the selected cylinder.

60. A method of minimizing variations in the speed as set forth in claim 59 wherein the only one cylinder is a cylinder that fires adjacent the selected cylinder.

61. A method of minimizing variations in the speed as set forth in claim 60 wherein the adjacent cylinder is the cylinder which fires preceding the selected cylinder.

62. A method of minimizing variations in the speed as set forth in claim 61 wherein the amount of fuel injected by the preceding cylinder is changed on the next cycle of operation.

63. A method of minimizing variations in the speed as set forth in claim 62 wherein the steps are repeated in sequence to maintain the speed constant.

64. An internal combustion engine having multiple cylinders and an output shaft driven by said cylinders, fuel injection means for injecting fuel into each of said cylinders, and control means for controlling the amount of fuel supplied by said fuel injectors, said control means including means for minimizing variations in the speed of the output shaft during a single revolution comprising means for selecting a cylinder that fires when the speed of the output shaft varies from the desired speed and adjusting the fuel injected to only one cylinder during a single sequence of firing of all cylinders to bring the speed closer to the desired speed, the only one cylinder being a cylinder other than the selected cylinder.

65. An internal combustion engine as set forth in claim 64 wherein the only one cylinder is a cylinder that fires adjacent the selected cylinder.

66. An internal combustion engine as set forth in claim 65 wherein the adjacent cylinder is the cylinder which fires preceding the selected cylinder.

67. An internal combustion engine as set forth in claim 66 wherein the amount of fuel injected by the preceding cylinder is changed on the next cycle of operation.

68. An internal combustion engine as set forth in claim 67 wherein the control repeats the steps in sequence to maintain the speed constant.

* * * * *

UNITED STATES PATENT AND TRADEMARK OFFICE
CERTIFICATE OF CORRECTION

PATENT NO. : 5,231,966
DATED : August 3, 1993
INVENTOR(S) : Takeo Yoshida et al

It is certified that error appears in the above-indentified patent and that said Letters Patent is hereby corrected as shown below:

Column 14, line 66, Claim 18, "12" should be --17--.

Column 15, line 2, Claim 19, "13" should be --18--.

Signed and Sealed this

Sixth Day of September, 1994

Attest:

BRUCE LEHMAN

*Attesting Officer*      *Commissioner of Patents and Trademarks*